(No Model.)

P. CURRAN.
NUT LOCK.

No. 260,848. Patented July 11, 1882.

Witnesses,
Geo. H. Strong.
L. H. Rourse

Inventor,
Phillip Curran
By Dewey & Co.
Attorneys

United States Patent Office.

PHILLIP CURRAN, OF CALIENTE, CALIFORNIA.

NUT-LOCK.

SPECIFICATION forming part of Letters Patent No. 260,848, dated July 11, 1882.

Application filed April 1, 1882. (No model.)

*To all whom it may concern:*

Be it known that I, PHILLIP CURRAN, of Caliente, county of Kern, State of California, have invented an Improved Nut-Lock; and I hereby declare the following to be a full, clear, and exact description thereof.

My invention relates to a new and useful nut-lock; and it consists in the employment of a locking device formed as an inverted W, one end or leg of which is longer than the other, said device being partially fitted under the nut when in a certain position, and by the movement of the nut adapted to advance to its limit by reason of the corner of the nut fitting within the space formed by its center pieces.

The object of my invention is to provide generally against the loosening of nuts after they are screwed up tightly in place, and to prevent them from coming off; but its particular application is to nuts securing the fish-plates of rails.

For a more particular explanation, reference is made to the following description and to accompanying drawings.

Figure 1:
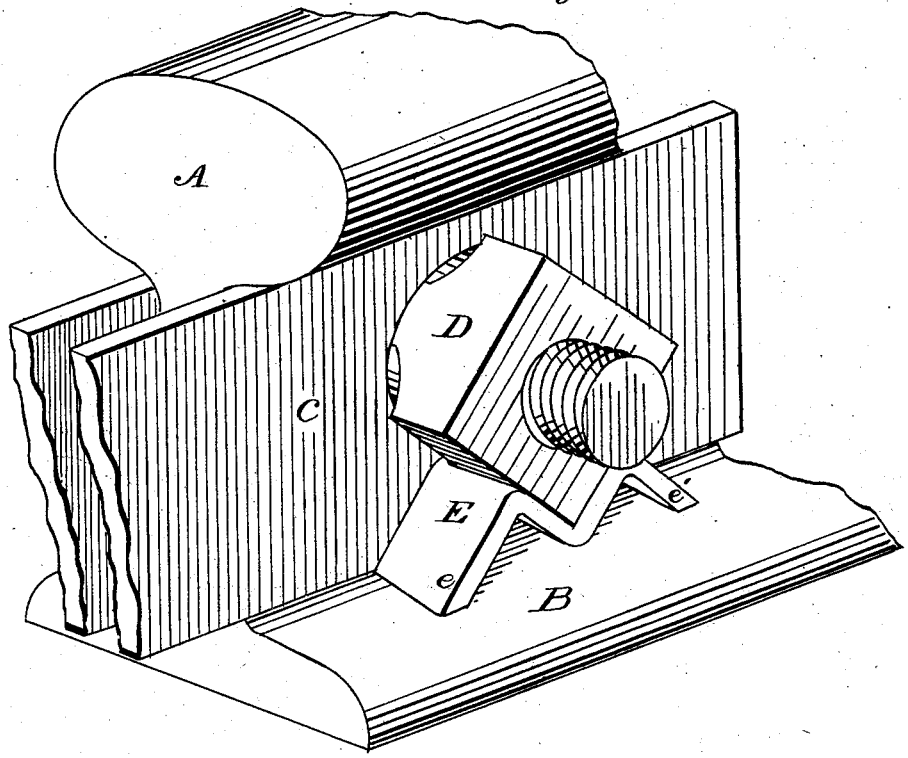
Figure 2:
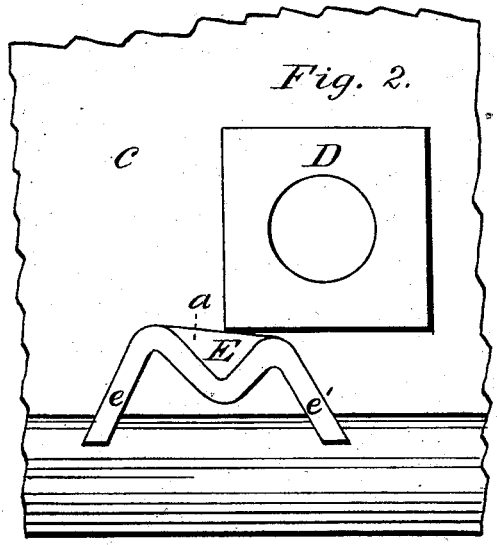
Figure 3:
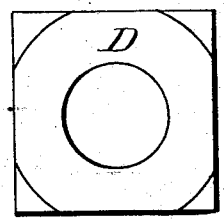
Figure 4:
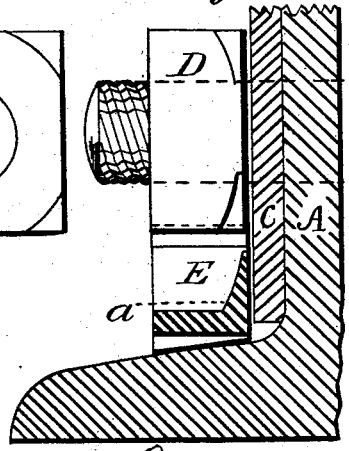

Figure 1 is a perspective. Fig. 2 is a front elevation of the nut and lock in position for setting. Fig. 3 is a back elevation of the nut. Fig. 4 is a section through the rail or fish-plate, showing a side elevation of the nut D and a section of the nut-lock.

Let A represent a rail, the flange of which is B, and C the plate, usually called the "fish-plate," which lies between the top of the rail and the flange and covers the meeting ends of two rails. Bolts are inserted through the rails and fish-plate from the other side, and are secured by nuts.

Let D represent one of the securing-nuts. E represents the locking device. It is cast in a single piece of the shape as shown—that is, it has sloping ends $e\ e'$ converging toward the top and centers converging toward the bottom, the whole resembling an inverted W. The space between the centers has a back wall, $a$. One end, $e$, of this device is longer than the other, and both have slightly-inclined bottoms to adapt them to the inclination or slope of the flange B and allow them to stand straight.

The operation of this device is as follows: First, screw the nut up upon the bolt a little tighter than necessity calls for, so that its edge may lie parallel with the flange B. When in this position the distance between its lower edge and the flange is only a little greater than the height of the short end $e'$ of the locking device, or just sufficient to allow this end to pass under the nut. Place this short end under the nut about one-third the distance of the locking device, as shown in Fig. 2. The nut, being too tight, is then given a slight turn back, when its corner will catch the top of the short end and pull the lock along the flange B, upon which it stands, until the space between the centers is brought directly under the corner, which then fits down in it, as shown in Fig. 1. The corners of the back of the nut are to be cut out, as shown, in order to allow the nut to fit close up against the fish-plate, notwithstanding the back wall, $a$, against which the cut-off corners fit.

The wall $a$ prevents the lock from slipping forward from under the nut, and the latter is effectively held in position for the following reason: To attempt to turn it back or loosen it any more it would have to push the lock farther on in the direction in which it started; but this it cannot do, because the height of the lock at that end is greater than the distance between the nut and the flange, and it is prevented from moving in that direction.

The only way to release the lock is to again tighten up the nut, when it will push the lock back to the position from which it started. In this manner the nut is held securely or locked, because its tendency is not to tighten but to work back to loosen itself.

Having thus described my invention, what I claim as new, and desire to secure by Letters Patent, is—

1. In combination with a base-plate and a nut, the locking device E, formed as an inverted W, one of the ends or legs of which is longer than the other, said locking device operating in connection with the nut, and constructed substantially as herein described.

2. In combination with a base-plate and a nut, D, having its corners upon its inner face cut out, as shown, the locking device E, formed as an inverted W, the space between the centers having a back wall, $a$, and one of the ends or legs being longer than the other, said locking device operating in connection with the nut, and constructed substantially as herein described.

3. In combination with a rail, A, having a flange, B, the fish-plate C, and nut D, with its cut out corners, the locking device E, formed as an inverted W, the space between the centers having a back wall, a, and one of the legs or ends being longer than the other, said locking device operating in connection with the nut, and constructed substantially as herein described.

In witness whereof I hereto set my hand.

PHILLIP CURRAN.

Witnesses:
S. H. NOURSE,
C. D. COLE.